(12) United States Patent
Lemke et al.

(10) Patent No.: US 7,757,011 B1
(45) Date of Patent: *Jul. 13, 2010

(54) METHOD AND SYSTEM FOR AUTOMATIC PERIPHERAL DEVICE IDENTIFICATION

(75) Inventors: Steve Lemke, Sunnyvale, CA (US); Rich Karstens, Lake Forest Park, WA (US); Bob Ebert, Montpellier (FR)

(73) Assignee: Palm Inc., Sunnyvale, CA (US)

( * ) Notice: Subject to any disclaimer, the term of this patent is extended or adjusted under 35 U.S.C. 154(b) by 1211 days.

This patent is subject to a terminal disclaimer.

(21) Appl. No.: 10/754,969

(22) Filed: Jan. 9, 2004

Related U.S. Application Data

(63) Continuation of application No. 09/727,228, filed on Nov. 29, 2000, now Pat. No. 6,694,428.

(51) Int. Cl.
*G06F 3/00* (2006.01)
(52) U.S. Cl. .............................. 710/10; 710/8; 710/48; 710/50; 713/1
(58) Field of Classification Search .................... 710/8, 710/10, 48–50, 268, 269; 713/1
See application file for complete search history.

(56) References Cited

U.S. PATENT DOCUMENTS

| | | | | |
|---|---|---|---|---|
| 4,025,906 | A | * | 5/1977 | Riikonen ..................... 710/16 |
| 4,972,312 | A | | 11/1990 | den Boef |
| 5,469,545 | A | * | 11/1995 | Vanbuskirk et al. ......... 709/234 |
| 5,680,624 | A | | 10/1997 | Ross |
| 5,708,816 | A | | 1/1998 | Culbert |
| 5,721,937 | A | | 2/1998 | Kurihara et al. |
| 5,781,744 | A | * | 7/1998 | Johnson et al. ............. 710/304 |
| 5,852,743 | A | | 12/1998 | Yeh |
| 5,948,077 | A | | 9/1999 | Choi et al. |
| 6,128,672 | A | | 10/2000 | Lindsley |
| 6,219,743 | B1 | * | 4/2001 | Kennel et al. ............... 710/260 |
| 6,311,242 | B1 | * | 10/2001 | Falkenburg et al. ......... 710/301 |
| 6,363,137 | B1 | * | 3/2002 | Nakao et al. ............... 379/1.01 |
| 6,429,812 | B1 | | 8/2002 | Hoffberg |
| 6,442,637 | B1 | * | 8/2002 | Hawkins et al. ............. 710/300 |
| 6,460,105 | B1 | * | 10/2002 | Jones et al. ................. 710/268 |
| 6,523,073 | B1 | | 2/2003 | Kammer et al. |

(Continued)

OTHER PUBLICATIONS

Don Anderson, "Universal Serial Bus System Architecture", 1997, p. 60-61.

(Continued)

*Primary Examiner*—Eron J Sorrell

(57) ABSTRACT

Method and system for latency-independent peripheral device identification. In one embodiment, a computer system receives an interrupt from a peripheral device coupled to a computer system communications port. In response, an interrupt notification message is posted alerting a notification handler running on the system. It is determined whether the interrupt is indicates peripheral class compliance. In one embodiment, communications port device sense pin voltage is determinative. If the interrupt indicates peripheral class compliance and the communications port is inactive, the port is opened, and inquiry sent to the peripheral device via the open port. The computer system then waits for response from the peripheral device. If response is received within a predetermined time, identification is posted based on the response, including peripheral device classification information, so that a software handler registered with the operating system can handle the identification message when received. Thus, this embodiment imposes no time-critical interrupt response.

13 Claims, 8 Drawing Sheets

U.S. PATENT DOCUMENTS

| | | |
|---|---|---|
| 6,631,394 B1 | 10/2003 | Ronkka et al. |
| 6,658,510 B1 | 12/2003 | Bartucca |
| 2004/0122992 A1 | 6/2004 | Janus et al. |
| 2004/0122997 A1 | 6/2004 | Diamant |

OTHER PUBLICATIONS

Tom Shanley, "Plug and Play System Architecture", 1995, p. 44-46.

* cited by examiner

METHOD AND SYSTEM FOR AUTOMATIC PERIPHERAL DEVICE IDENTIFICATION

RELATED UNITED STATES APPLICATION

This application is a Continuation of co-pending U.S. patent application Ser. No. 09/727,228, entitled "Method and System for Latency-independent Peripheral Device Identification" by Steve Lemke, et al., with the filing date of Nov. 29, 2000, now U.S. Pat. No. 6,694,428 which is hereby incorporated herein by reference.

BACKGROUND OF THE INVENTION

1. Field of the Invention

The present invention relates to peripheral device identification and interrupt management. More specifically, the present invention pertains to a method and system that enables device identification to be performed without a rigid time limit within which an initial interrupt from the device needs to be serviced.

2. Related Art

Computer systems and other electronic devices have become integral tools that are used extensively to perform a wide variety of useful operations in modern society. Applications of computer systems can be found in virtually all fields and disciplines, including but not limited to business, industry, scientific research, education and entertainment. For instance, computer systems are used to analyze financial data, to control industrial machinery, to model chemical molecules, to deliver classroom presentations and to generate special effects for movies. Moreover, computer systems along with other electronic devices are finding new applications as a result of advances in hardware technology and rapid development in software technology. The growing affordability of computer systems and electronic devices together with the abundance of useful new applications have fueled strong demand for such systems and devices.

Included within this broad category of computers and electronic devices is the personal digital assistant (commonly referred to as a PDA). Specifically, as the components required to build a computer system have been greatly reduced in size, new categories of computer systems have emerged. One of these new categories of computer systems is the PDA. A PDA is a portable computer system which is small enough to be held conveniently and comfortably in the hand of its user. In particular, a popular size for the typical PDA approximates the size of a palm.

The PDA is usually a battery-powered device that is typically used as an electronic organizer having the capability to store and display a wide range of information which can include numerous addresses and telephone numbers of business and personal acquaintances, financial information, daily appointments, along with various other personal information. As such, the PDA is able to consolidate a wide variety of information and make the information easily accessible by its user. Therefore, PDAs are very useful and have gained wide popularity.

Since PDAs are such small devices, full-sized keyboards are generally not efficient input devices. For instance, PDAs using keyboards usually have keyboard devices that are so small that a user typically cannot touch-type on them. Many PDAs thus employ a stylus and a digitizer pad as an input system. The stylus and digitizer pad work well for PDAs because the arrangement allows a user to hold the PDA in one hand while writing with the stylus onto the digitizer pad with the other hand. A small on-screen keyboard image can also be used for data entry. By eliminating the need for a keyboard, PDAs are very portable and can be carried along by their users wherever they go, even when on extended travel. On the other hand, due to their small size, PDAs usually have a modest set of built-in functions and it is often beneficial to couple peripheral devices therewith to expand functionality. The greater the variety of peripheral devices a PDA is capable of operating with, the broader the functionality it can achieve.

Moreover, the management of communications port contention and power consumption affect the ease of use and the battery life of PDAs and other hand-held computers. A typical PDA includes limited communications port resources. For example, the Palm V personal organizer, manufactured by Palm Computing, Inc. of Santa Clara, Calif., has a single communications port available to interface with peripherals. When the communications port is exclusively occupied by a peripheral, the communications port is unavailable for other uses. Thus, a PDA with an active keyboard occupying the communications port, for instance, may be unable to perform an infrared (IR) synchronization process with another device.

Another ease of use issue is the degree of user intervention required to manage a communications port and identify peripheral devices coupled thereto. Requiring a user to manually open the communications port and identify a peripheral device, such as through the graphical user interface (GUI) or the buttons of the PDA or hand-held computer, is generally less preferable to automatically opening the communications port and identifying the peripheral device when the PDA receives information from a peripheral device upon coupling. Further, requiring a user to explicitly close the communications port is also generally less desirable than automatically closing the communications port after the peripheral device and the PDA no longer exchange data. In one existing solution, the PDA will automatically close a communications channel, which was opened to work with a keyboard peripheral, when the PDA is prompted with a signal initiating a synchronization process, such as when the PDA is placed in a cradle for a HotSync process. However, if a user forgets to explicitly close the communications port after using a keyboard that occupied the communications port, the user may be unable to perform an infrared synchronization process. In such cases, the synchronization process cannot be initiated until the situation is resolved. A user unfamiliar with the problem may even have the mistaken impression that the PDA has malfunctioned.

Furthermore, requiring a user to manually close the communications port also affects power consumption. Battery powered systems, such as PDAs and other hand-held devices, are sensitive to applications that drain excessive power. Thus, PDAs mostly leave their communications ports in a low power standby mode, because an open communications channel may consume significant power. For example, the Palm V personal organizer has a communications port included in the processor that is shared between an infrared communications port and an RS-232 serial communications port. The Palm V hand-held organizer keeps these ports in standby mode to reduce power consumption. A user who forgets to close the communications port after a peripheral device is no longer being used may suffer a significantly decreased battery life, and be forced to recharge or change batteries often.

Even if a user remembers to close the communications port when the attached peripheral device is no longer being used, the port has to be reopened for further communications with a peripheral device when use is resumed. When the communications port is reopened, the attached peripheral device needs to be identified. Identifying the peripheral device permits the PDA to open appropriate applications and select appropriate communication protocols. Some existing handheld computers provide limited capability for identifying peripheral devices. For example, in an existing Palm organizer, this is implemented with two pins on a serial port. According to this technique, an interrupt is generated by bringing up one of the pins (e.g., making the pin "high"). An interrupt routine then checks the second pin to determine if it is high or low (e.g., high indicates modem, low indicates cradle). One problem with this technique is that it only allows two different types of devices to wake up the serial port. In other words, this peripheral device identification scheme is limited to identifying one of two devices, for example, a cradle versus a modem. As hand-held computer technology advances and its applications multiply, an increasing number of peripheral devices are becoming available for use with hand-held computers and PDAs, but the existing device identification technique are not capable of distinguishing among the numerous devices.

Some other approaches to peripheral device identification are capable of identifying more than two types of devices. Typically, such approaches involve performing certain detection activities in a given time period immediately following the initial interrupt generated by the device as described above. According to these approaches, additional input is generated by the peripheral device and received by the handheld computer during this prescribed time period. For example, the additional input may include one or more specific characters or additional interrupt(s). Based on the additional input, such as by monitoring for the specific inbound character(s) or by counting the additional interrupts, the hand-held computer determines the type of the peripheral device being coupled thereto.

Nevertheless, these identification schemes also have their shortcomings. In particular, these schemes impose a hard limit on the latency within which the initial interrupt generated by the peripheral device must be handled in order for the respective schemes to succeed. Such a time-critical interrupt response requirement is undesirable because the hand-held computer may be engaged in other computations when the initial interrupt is generated and thus may be unable to service the interrupt within the requisite time frame. Under these circumstances, peripheral device identification according to these time-critical schemes would fail.

Thus, in view of the foregoing problems that are inherent in existing peripheral device identification schemes, it would be highly advantageous to provide a peripheral device identification system and method that facilitates extendible identification of various peripheral devices, where the successful operation of the system and method does not require that the initial interrupt generated by the peripheral device be handled within a critical time period.

Additionally, a method and system for peripheral device identification should not require complete revamping of existing hand-held computer systems or PDAs. In other words, in implementing a viable method and system for peripheral device identification, components that are well known in the art and are compatible with existing hand-held computer systems need to be used so that the cost of realizing the method and system for peripheral device identification is low. By so doing, the need to incur costly expenditures for retrofitting existing hand-held computer systems or for building custom components is eliminated.

SUMMARY OF THE INVENTION

It would be advantageous to provide a method and system for peripheral device identification that enables extendible identification of various peripheral devices, and yet the successful operation of the system and method does not require that the initial interrupt generated by the peripheral device be handled within a critical time period. Furthermore, it would also be advantageous for such method and system to utilize components that are well known in the art and are compatible with existing computer systems such that the method and system can readily operate with other systems and applications without extensive retrofitting.

Accordingly, the present invention provides a method and system for extendible identification of peripheral devices which is latency-independent. More particularly, embodiments of the present invention impose no critical interrupt response requirement for successful operation, thus providing a superior and more flexible solution to peripheral device identification than existing approaches. Moreover, embodiments of the present invention can be efficiently implemented using components that are well known in the art and are compatible with existing hand-held computer systems as well as peripheral devices. As such, the present invention delivers a method and system that is readily operable with existing systems and applications without extensive retrofitting. These and other advantages of the present invention not specifically mentioned above will become clear within discussions of the present invention presented herein.

More specifically, in one embodiment of the present invention, a method for identifying a peripheral device detachably coupled to a computer system is provided. In this embodiment, an interrupt is received by the computer system from the peripheral device, which is coupled to a communications port of the computer system. In response to the interrupt, an interrupt notification message is posted to alert a notification handler running on the computer system. It is next determined whether the interrupt is indicative of a compliant peripheral class. In one embodiment, this is achieved by examining a device sense pin of the communications port to determine the voltage thereon. If the interrupt is determined to be indicative of the compliant peripheral class and the communications port is inactive, the port is opened, and an inquiry is sent to the peripheral device via the open port. The computer system then waits to receive a response from the peripheral device via the open communications port. If a response is received within a predetermined time period, an identification notification message is posted based on data in the response, which data include information for classifying the peripheral device, so that a software handler registered with the operating system can handle the identification notification message when the software handler receives it.

In a specific embodiment, the present invention includes the above and wherein the computer system is a PDA. In a currently preferred embodiment, the present invention includes the above and wherein the compliant peripheral class comprises RS-232 peripherals.

Another embodiment of the present invention includes the above recited steps and further comprises the step of posting a no-response notification message to trigger further processing, if no response is received within the predetermined time period after the inquiry is sent.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

In the following detailed description of the present invention, a method and system for latency-independent peripheral device identification, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "posting", "opening", "sending", "monitoring", "examining" or the like, refer to the action and processes of a computer system (e.g., FIG. 5), or similar electronic computing device, that manipulates and transforms data represented as physical (electronic) quantities within the computer system's registers and memories into other data similarly represented as physical quantities within the computer system memories or registers or other such information storage, transmission or display devices.

Figure 5:
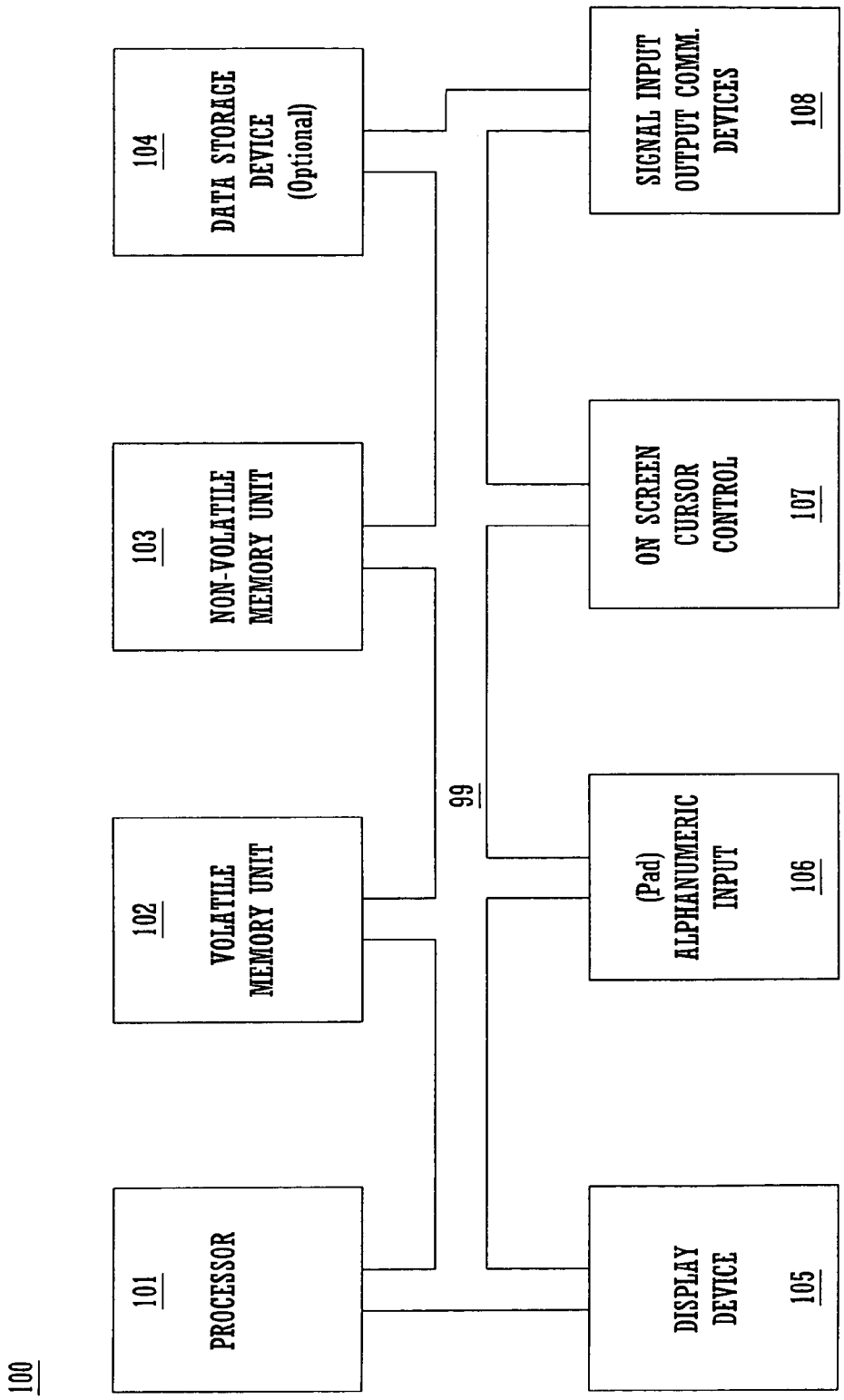
FIG. 5 is a logical block diagram of circuitry located within the exemplary personal digital assistant computer system of FIG. 2A.

Aspects of the present invention, described below, are discussed in terms of steps executed on a computer system. These steps (e.g., process 700) are implemented as program code stored in computer readable memory units of a computer system and are executed by the processor of the computer system. Although a variety of different computer systems can be used with the present invention, an exemplary personal digital assistant computer system is shown in FIG. 5 further below.

Figure 1:
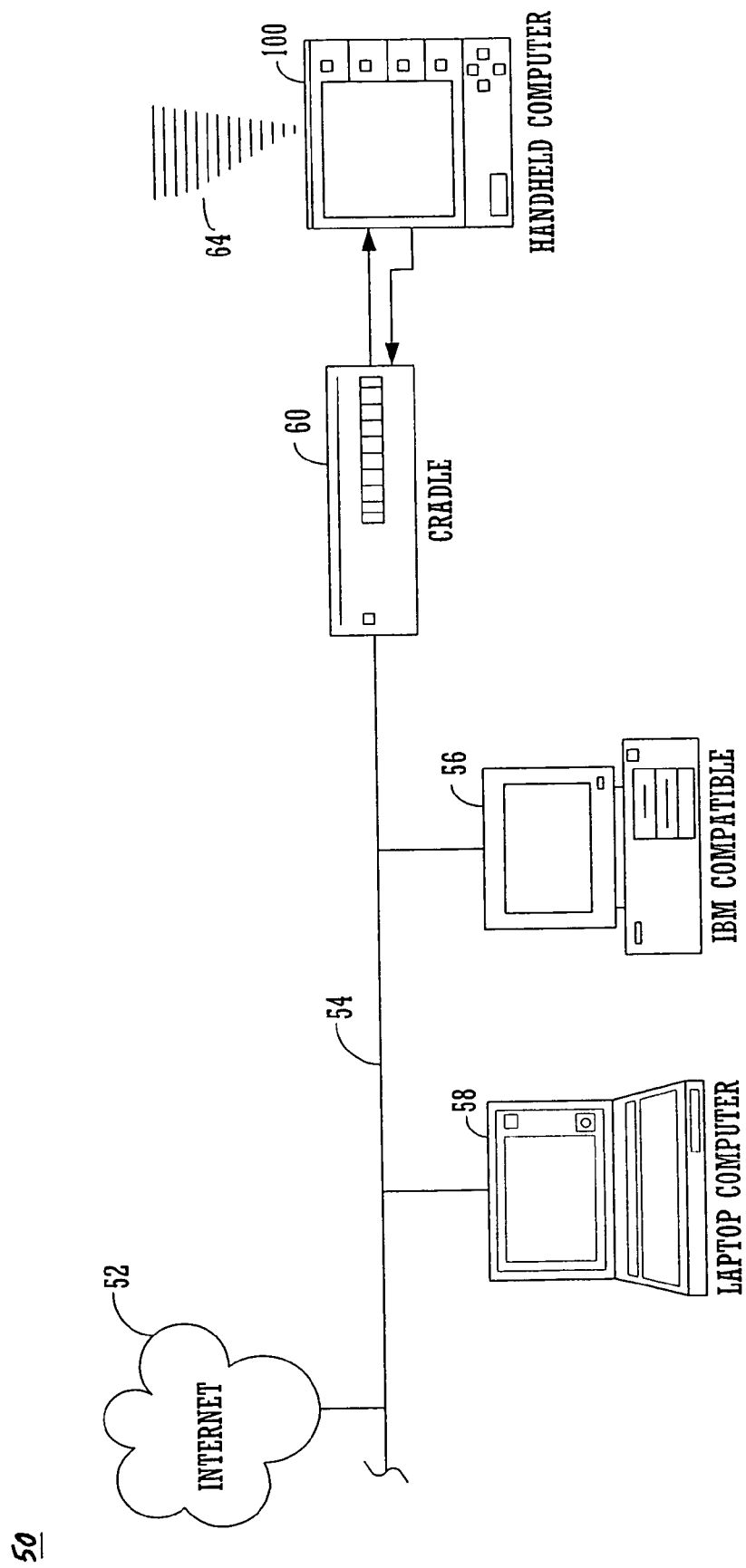
FIG. 1 is a system illustration of an exemplary personal digital assistant computer system connected to other computer systems and the Internet via a cradle device.

An Illustrative Computer System Environment within which Embodiments of the Present Invention can be Practiced Referring now to FIG. 1, a system 50 that can be used in conjunction with the present invention is shown. It is appreciated that the method and system for latency-independent peripheral device identification of the present invention can be used in conjunction with any computer system and that system 50 is illustrative rather than limiting. It is further appreciated that the portable computer system 100 described below is only exemplary. System 50 comprises a host computer system 56 which can either be a desktop unit as shown, or, alternatively, can be a laptop computer system 58. Optionally, one or more host computer systems can be used within system 50. Host computer systems 58 and 56 are shown connected to a communication bus 54, which in one embodiment can be a serial communication bus, but could be of any of a number of well known designs, e.g., a parallel bus, Ethernet, Local Area Network (LAN), etc. Optionally, bus 54 can provide communication with the Internet 52 using a number of well known protocols.

Importantly, bus 54 is also coupled to a cradle 60 for receiving and initiating communication with a personal digital assistant computer system 100. Cradle 60 provides an electrical and mechanical communication interface between bus 54 (and anything coupled to bus 54) and computer system 100 for two way communications. Computer system 100 also contains a wireless infrared communication mechanism 64 for sending and receiving information from other devices. A more detailed description of the structure of an illustrative implementation of computer system 100 and its operation in conjunction with various peripheral devices is presented further below with reference to FIG. 6.

Figure 2A:
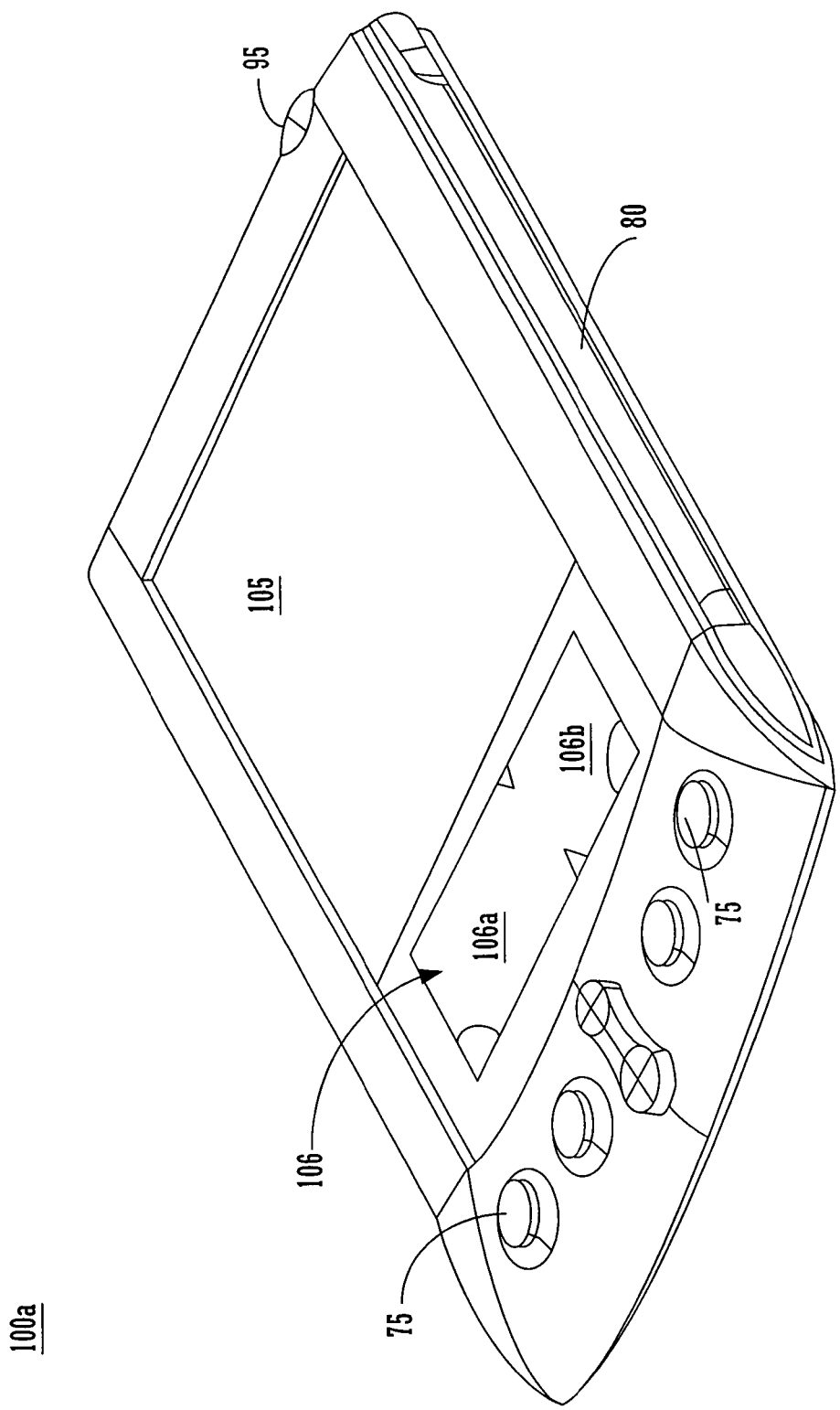
FIG. 2A is a top side perspective view of an exemplary personal digital assistant computer system.

With reference to FIG. 2A, a perspective illustration of the top face 100a of exemplary personal digital assistant computer system 100 is shown. Top face 100a contains a display screen 105 surrounded by a bezel or cover. A removable stylus 80 is also shown. Display screen 105 is a touch screen capable of registering contact between the screen and the tip of stylus 80. Stylus 80 can be fabricated of any material which can make contact with screen 105. Top face 100a also contains one or more dedicated and/or programmable buttons 75 for selecting information and causing computer system 100 to implement functions. An on/off button 95 is shown as well.

Referring still to FIG. 2A, a handwriting recognition pad or "digitizer" containing regions 106a and 106b is also shown. Specifically, region 106a is for the drawing of alpha characters therein for automatic recognition and region 106b is for the drawing of numeric characters therein for automatic recognition. Stylus 80 is used for stroking a character within one of the regions 106a and 106b. The stroke information is then fed to an internal processor for automatic character recognition. Once characters are recognized, they are typically displayed on screen 105 for verification and/or modification.

Figure 2B:
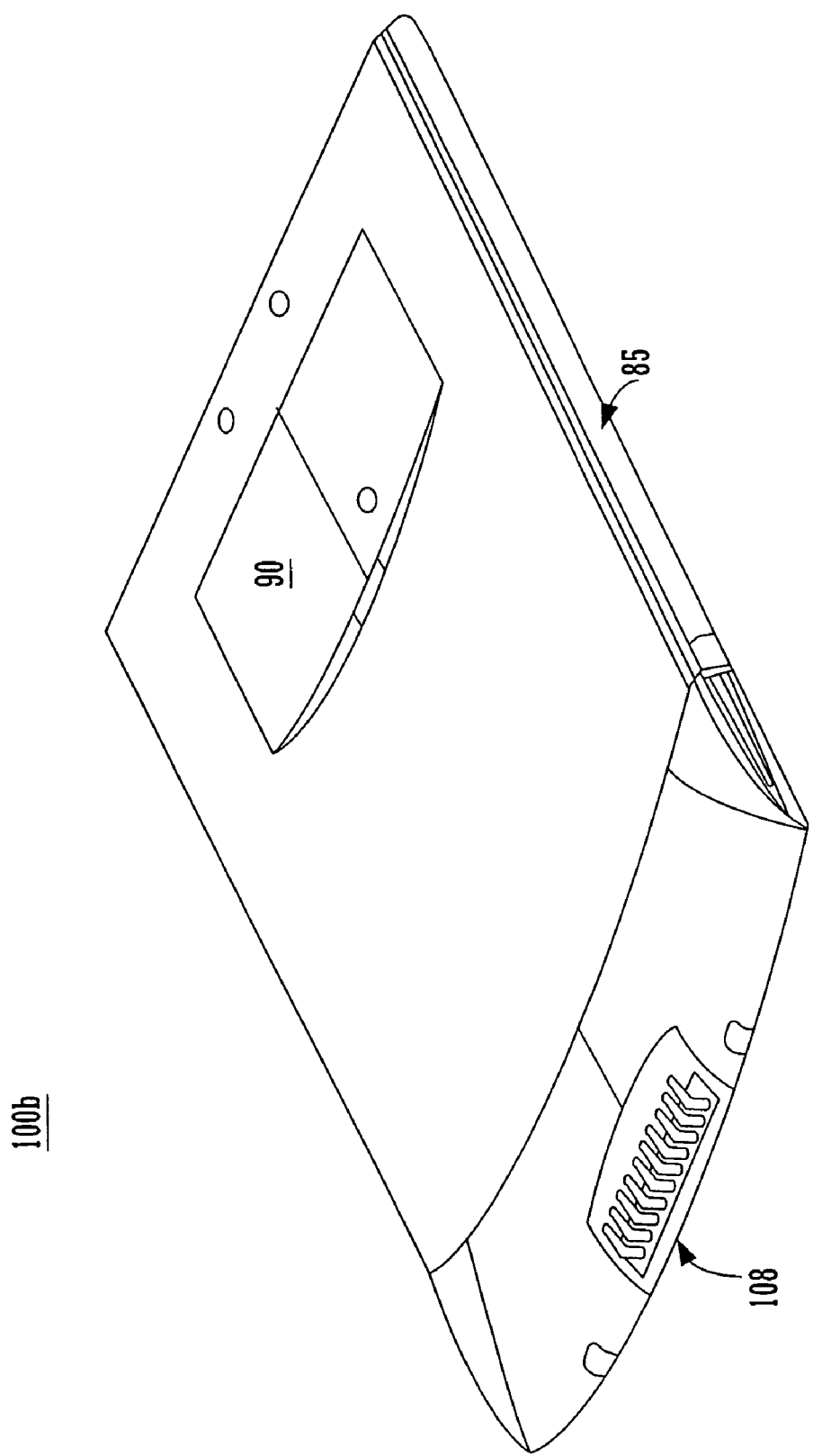
FIG. 2B is a bottom side perspective view of the personal digital assistant computer system of FIG. 2A.

FIG. 2B illustrates the bottom side 100b of one embodiment of personal digital assistant computer system 100. An optional extendible antenna 85 is shown, and a battery storage compartment door 90 is shown as well. A communication interface 108 is also shown. In one embodiment of the present invention, the serial communication interface 108 comprises a serial communication port, but it could also alternatively be of any of a number of well known communication standards and protocols, e.g., parallel, small computer system interface (SCSI), Ethernet, Firewire (IEEE 1394), etc. In a currently preferred embodiment, communication interface 108 comprises an interrupt pin and a device sense pin, sometimes also known as a VID pin. Communication interface 108 in accordance with the present invention is described in further detail below with reference to FIG. 6.

Figure 3:
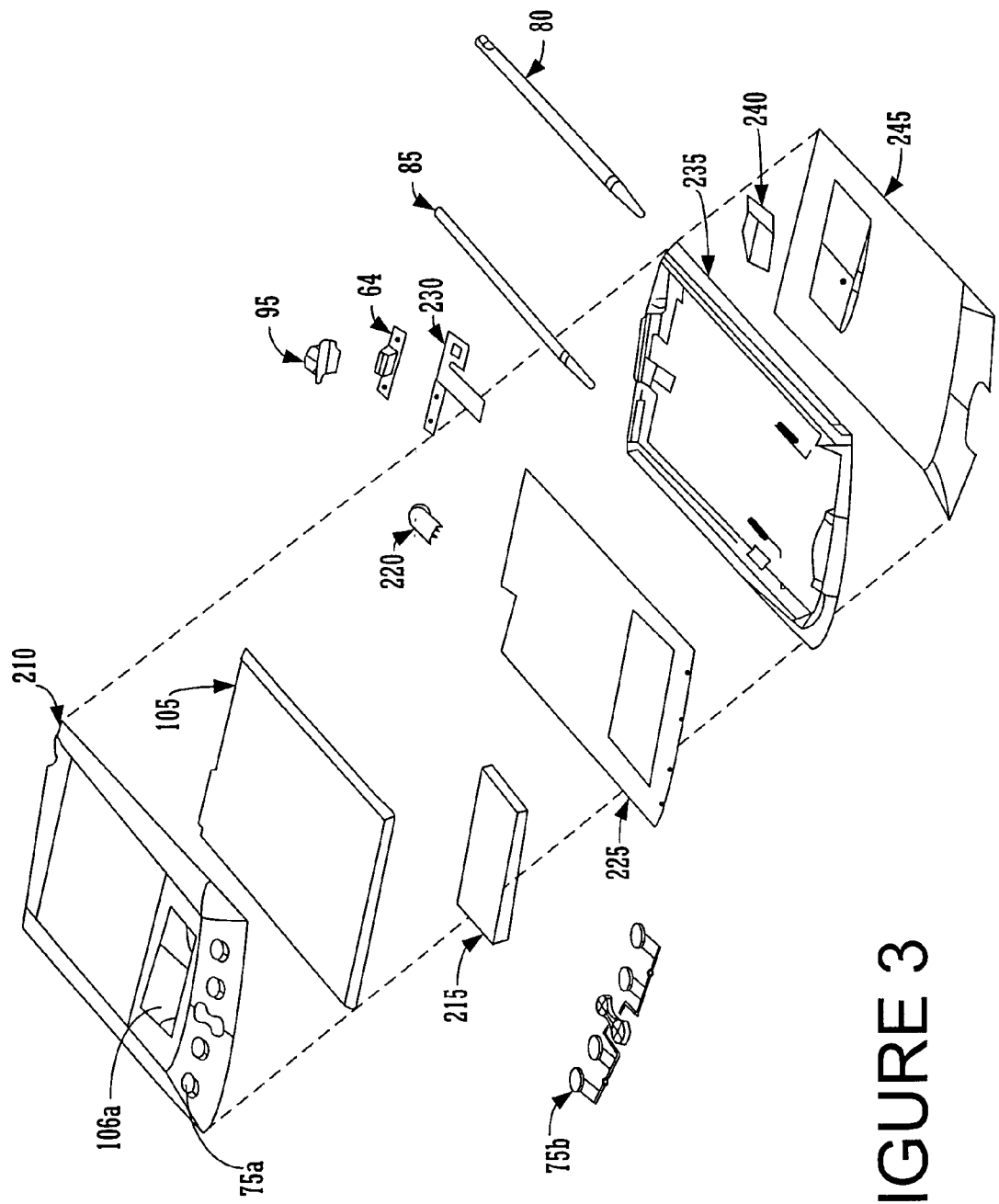
FIG. 3 is an exploded view of the components of the exemplary personal digital assistant computer system of FIG. 2A.

With reference now to FIG. 3, an exploded view of the exemplary personal digital assistant computer system 100 is shown. System 100 contains a front cover 210 having an outline of region 106 and holes 75a for receiving buttons 75b. A flat panel display 105 (both liquid crystal display and touch screen) fits into front cover 210. Any of a number of display technologies can be used, e.g., liquid crystal display (LCD), field emission device (FED), plasma, etc., for the flat panel display 105. A battery 215 provides electrical power. A contrast adjustment (potentiometer) 220 is also shown. On/off button 95 is shown along with an infrared emitter and detector device 64. A flex circuit 230 is shown along with a PC board 225 containing electronics and logic (e.g., memory, communication bus, processor, etc.) for implementing computer system functionality. The digitizer pad is also included in PC board 225. A midframe 235 is shown along with stylus 80. Position adjustable antenna 85 is also shown.

Additionally, a radio receiver/transmitter device 240 is also shown between the midframe and the rear cover 245 of FIG. 3. Radio receiver/transmitter device 240 is coupled to antenna 85 and also coupled to communicate with PC board 225. In one implementation, the Mobitex wireless communication system is used to provide two way communication between system 100 and other networked computers and/or the Internet via a proxy server.

Figure 4:
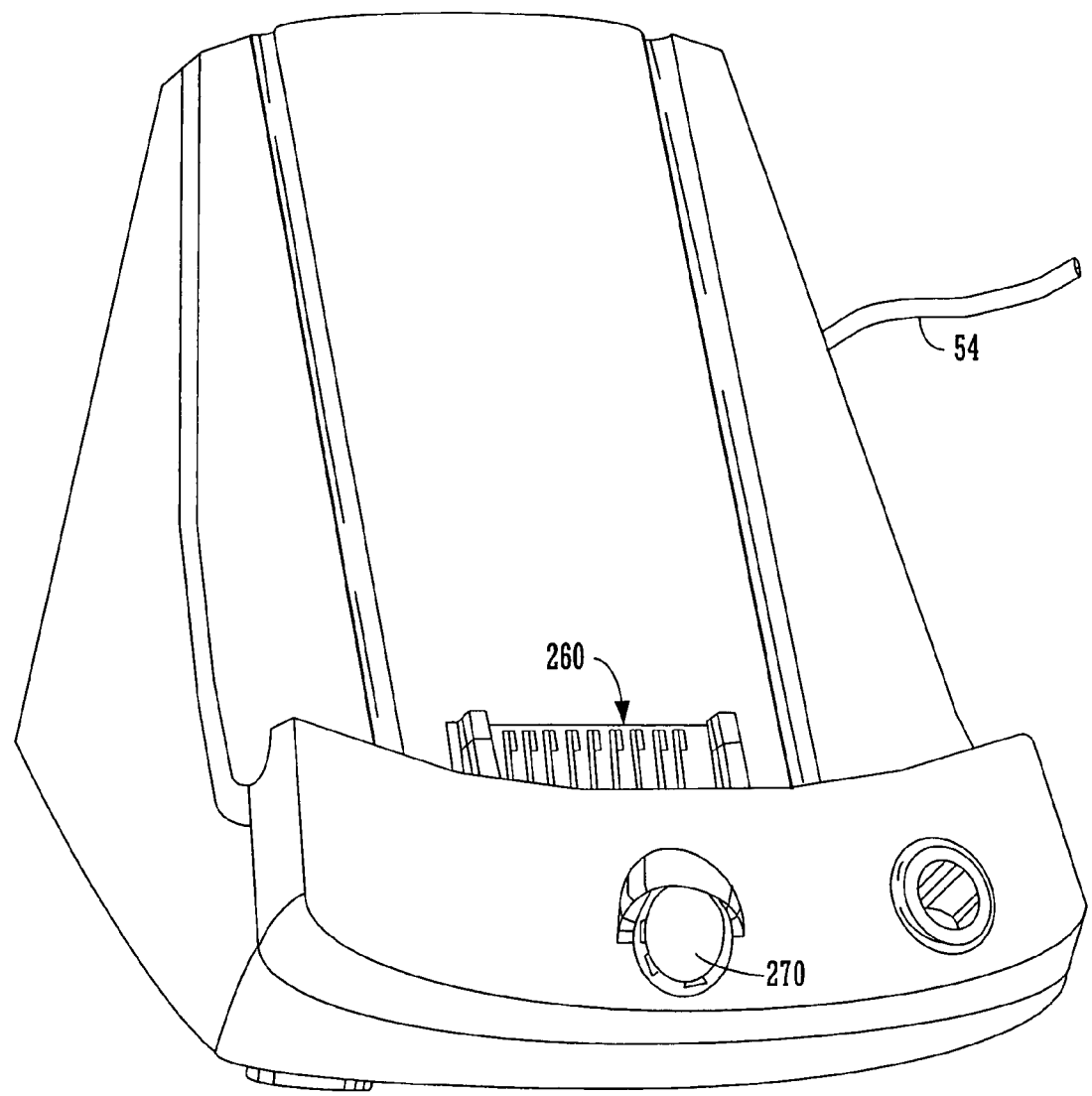
FIG. 4 is a perspective view of the cradle device for connecting the personal digital assistant computer system to other systems via a communication interface.

FIG. 4 is a perspective illustration of one embodiment of the cradle 60 for receiving the personal digital assistant computer system 100. Cradle 60 contains a mechanical and electrical interface 260 for interfacing with serial connection 108 (FIG. 2B) of computer system 100 when system 100 is slid into the cradle 60 in an upright position. Once inserted, button 270 can be pressed to initiate two way communication between system 100 and other computer systems coupled to serial communication bus 54.

Referring now to FIG. 5, a block diagram of exemplary personal digital assistant computer system 100 is shown. Some of the modules shown in FIG. 5 can be implemented on PC board 225. Computer system 100 includes an address/data bus 99 for communicating information, a central processor 101 coupled with bus 99 for processing information and instructions, a volatile memory unit 102 (e.g., random access memory, static RAM, dynamic RAM, etc.) coupled with bus 99 for storing information and instructions for central processor 101 and a non-volatile memory unit 103 (e.g., read only memory, programmable ROM, flash memory, EPROM, EEPROM, etc.) coupled with bus 99 for storing static information and instructions for processor 101. As described above, computer system 100 also contains a display device 105 coupled to bus 99 for displaying information to the computer user. PC board 225 can contain processor 101, bus 99, volatile memory unit 102, and non-volatile memory unit 103. As described further below, portions of memory units 102 and 103 can be removed from computer system 100. Moreover, computer system 100 can also include an optional data storage device 104 (e.g., memory stick) for storing information and instructions. In one embodiment, optional data storage device 104 is removable from computer system 100.

Also included in computer system 100 of FIG. 5 is an optional alphanumeric input device 106 which, in one implementation, is a handwriting recognition pad ("digitizer") having regions 106a and 106b (FIG. 2A), for instance. Device 106 can communicate information and command selections to central processor 101. Computer system 100 also includes an optional cursor control or directing device 107 coupled to bus 99 for communicating user input information and command selections to central processor 101. In one implementation, device 107 is a touch screen device incorporated with screen 105. In this implementation, device 107 is capable of registering a position on screen 105 where a stylus makes contact. Display device 105 utilized with computer system 100 may be a liquid crystal device (LCD), cathode ray tube (CRT), field emission device (FED, also called flat panel CRT) or other display device suitable for creating graphic images and alphanumeric characters recognizable to the user. In a currently preferred embodiment, display 105 is a flat panel display. Computer system 100 also includes signal communication interface 108, which is also coupled to bus 99, and can be a serial port for communicating with cradle 60. Communication interface 108 can also include an infrared communication mechanism.

It is appreciated that computer system 100 described herein illustrates an exemplary configuration of an operational platform upon which embodiments of the present invention can be implemented. Nevertheless, other computer systems with differing configurations can also be used in place of computer system 100 within the scope of the present invention.

Figure 6:
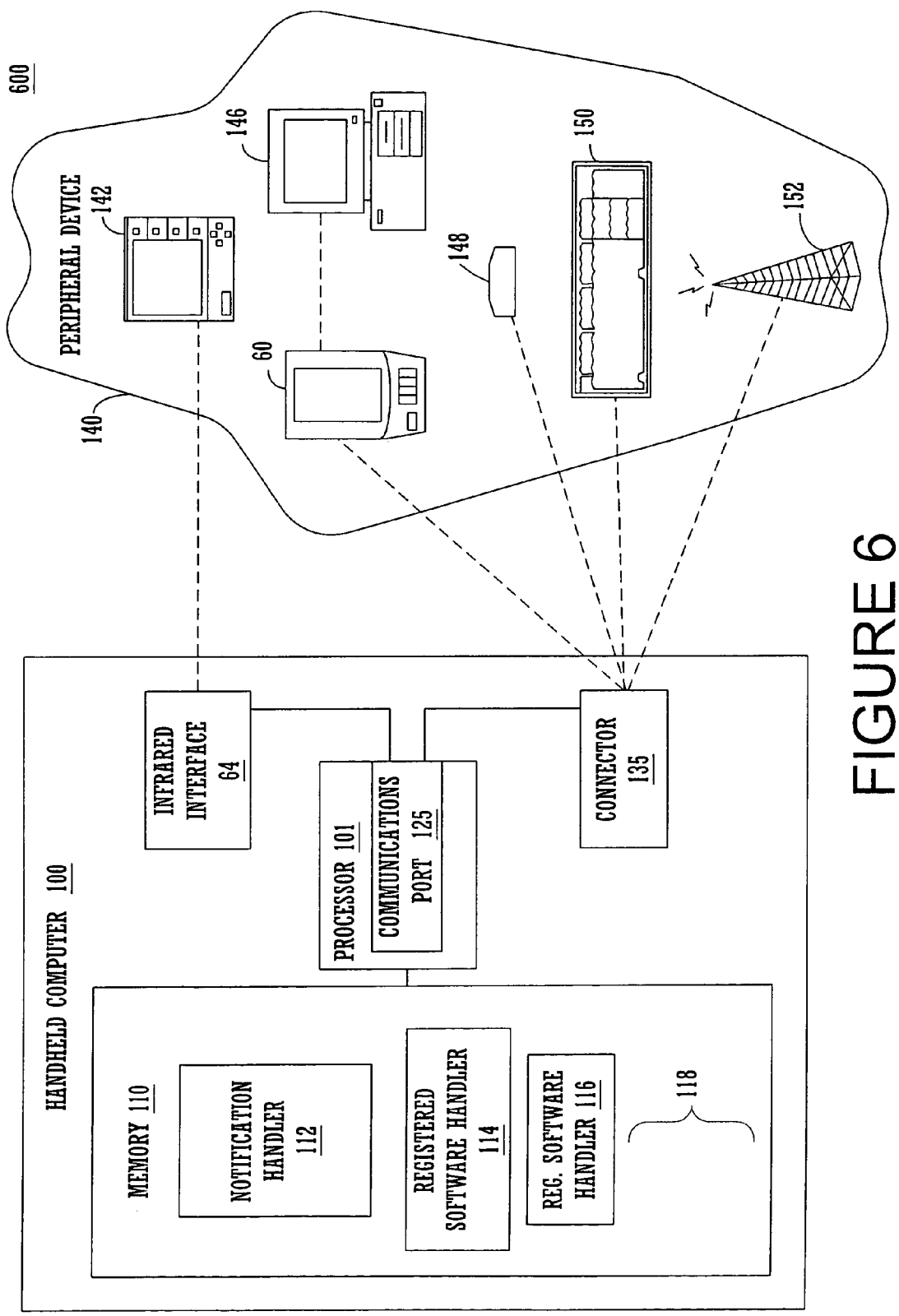
FIG. 6 is a block diagram of a system practicing peripheral device identification in accordance with one embodiment of the present invention.

Referring next to FIG. 6, a block diagram is shown of a system 600 practicing peripheral device identification in accordance with one embodiment of the present invention. System 600 includes a hand-held computer 100 and a peripheral device 140. Example embodiments of the hand-held computer 100 include various models of the Palm hand-held organizers, as well as numerous other hand-held computers running a version of the Palm operating system, or PalmOS. Additional embodiments include other hand-held computers, such as those running a version of Microsoft's Windows CE operating system and those running a version of the EPOC operating system, as well as set-top boxes. On the other hand, examples of peripheral devices include keyboards, cradles, modems, other computers such as hand-held computers, along with other hardware modules or accessories not specifically mentioned herein.

As illustrated in FIG. 6, hand-held computer 100 includes a memory 110 (e.g., volatile memory unit 102, non-volatile memory unit 103 of FIG. 5) and processor 101. Memory 101 can store various programs, or sequences of instructions for execution by processor 101. Example programs shown include a notification handler 112 and registered software handlers 114 and 116. Other programs 118 can include programs for carrying out other internal functions of hand-held computer 100 and for carrying out functions appropriate with peripheral device 140. Some of the programs may be included in device drivers, the operating system, and/or applications.

In a currently preferred embodiment, hand-held computer 100 further includes infrared interface 64 and a connector 135, and processor 101 includes a communications port 125. In this embodiment, communication interface 108 (FIG. 1) of computer 100 comprises infrared interface 64, communications port 125, and connector 135. Hand-held computer 100 communicates with peripheral device 140 via one or more communications ports 125. In one embodiment, processor 101 is a DragonBall processor manufactured by Motorola, Inc. For example, the Palm 111x and Palm V hand-held computers use a DragonBall processor model known as the DragonBall EZ MC68EZ238 Integrated Microprocessor. Other embodiments use different microprocessors. An embodiment implemented using the DragonBall EZ processor has a communications port 125 that includes one serial port, while other embodiments of the present invention can include multiple serial ports, one or more parallel port(s), or other configurations.

It is appreciated that even though embodiments of the present invention are not limited to one communications port but rather can include multiple communication ports, the present invention beneficially enables an increase in the total number of peripherals which the hand-held computer can identify.

In accordance with the present invention, communications port 125 communicates with peripheral device 140 via a wired or wireless connection. An example of a wireless connection is a communication link between two hand-held computers 100 and 142 carried out in infrared through infrared interface 64 coupled to communications port 125. In infrared communication, an infrared transceiver included in infrared interface 64 of hand-held computer 100 communicates with the infrared transceiver of another hand-held computer 142. In one embodiment, the transceivers follow an IrDA (Infrared Data Association) protocol. In other embodiments, other protocols are used.

An example of a wired connection is a communication link between hand-held computer 100 and cradle 60, through connector 135 coupled to communications port 125. This is a configuration that is often used to synchronize data between hand-held computer 100 and another computer 146 (e.g., desktop computer 56 or laptop computer 58 of FIG. 1). Another example of a wired connection is a communication link between hand-held computer 100 and a keyboard 150 through connector 135.

Within the scope of the present invention, in addition to the devices mentioned above, peripheral device 140 can also be a modem 148, devices for cellular or personal communication services, other wireless devices 152 including radio, infrared, and acoustic communication peripherals, as well as Bluetooth devices. Information on the Bluetooth communication specification is not described herein but is available on the Internet at the address http://www.bluetooth.com. In a currently preferred embodiment, peripheral device 140 includes circuitry for sending a wake-up signal (e.g., an interrupt) to hand-held computer 100 through connector 135, as well as circuitry for identifying to hand-held computer 100 the type (e.g., peripheral class) of peripheral device 140. Both sets of circuitry are electrically coupled to hand-held computer 100 through connector 135.

In communication through connector 135, one embodiment of the present invention uses an electrical transceiver and a serial connector with ten pins supporting EIA562 interface signals and RS-232 protocol communications, and additional signals for support of another peripheral device 140.

One possible configuration of connector 135 supporting EIA562 interface signals and RS-232 protocol communications includes DTR (data terminal ready), VCC, RD (receive data), RTS (request to send), TD (transmit data), CTS (clear to send), GPI1 (HotSync initiation interrupt line), GPI2 (peripheral identification line for synchronization), a pin reserved for future designs, and SG (signal ground).

Another possible configuration of connector 135 supporting EIA562 interface signals and RS-232 protocol communications includes DO (voltage doubler output or data terminal ready), VBATT+ (tied to the battery), RXD (receive data), RTS (request to send), TXD (transmit data), CTS (clear to send), I1 (HotSync initiation interrupt line), I2 (peripheral identification line for synchronization), a pin reserved for future designs, and SG (signal ground).

Other embodiments of connector 135 include parallel connectors, different pin configurations, a different number of pins, and different connector signals including DSR (data set ready), RI (ring indicator), CD (carrier detect), and TC (transmitter clock).

One embodiment of hand-held computer 100 includes an electrical transceiver used in communication through connector 135. When the electrical transceiver is shut down, the transceiver sends a low RS-232_V+ signal of 3.0 volts to connector 135. In the Palm hand-held organizer, the electrical transceiver is shut down or placed in standby mode when connector 135 is inactive in order to conserve power and lengthen the battery life for hand-held computer 100. When software running on processor 101 of hand-held computer 100 opens communications port 125, the transceiver is enabled and sends to connector 135 an asserted signal, a high RS-232_V+ signal of 6.0 volts. Other embodiments include communications protocols that are simplex and half duplex in addition to the full duplex RS-232 protocol. Additional embodiments support RS-485, RS-422, IEEE-1284, IEEE-1394, and USB standards.

Figure 7:
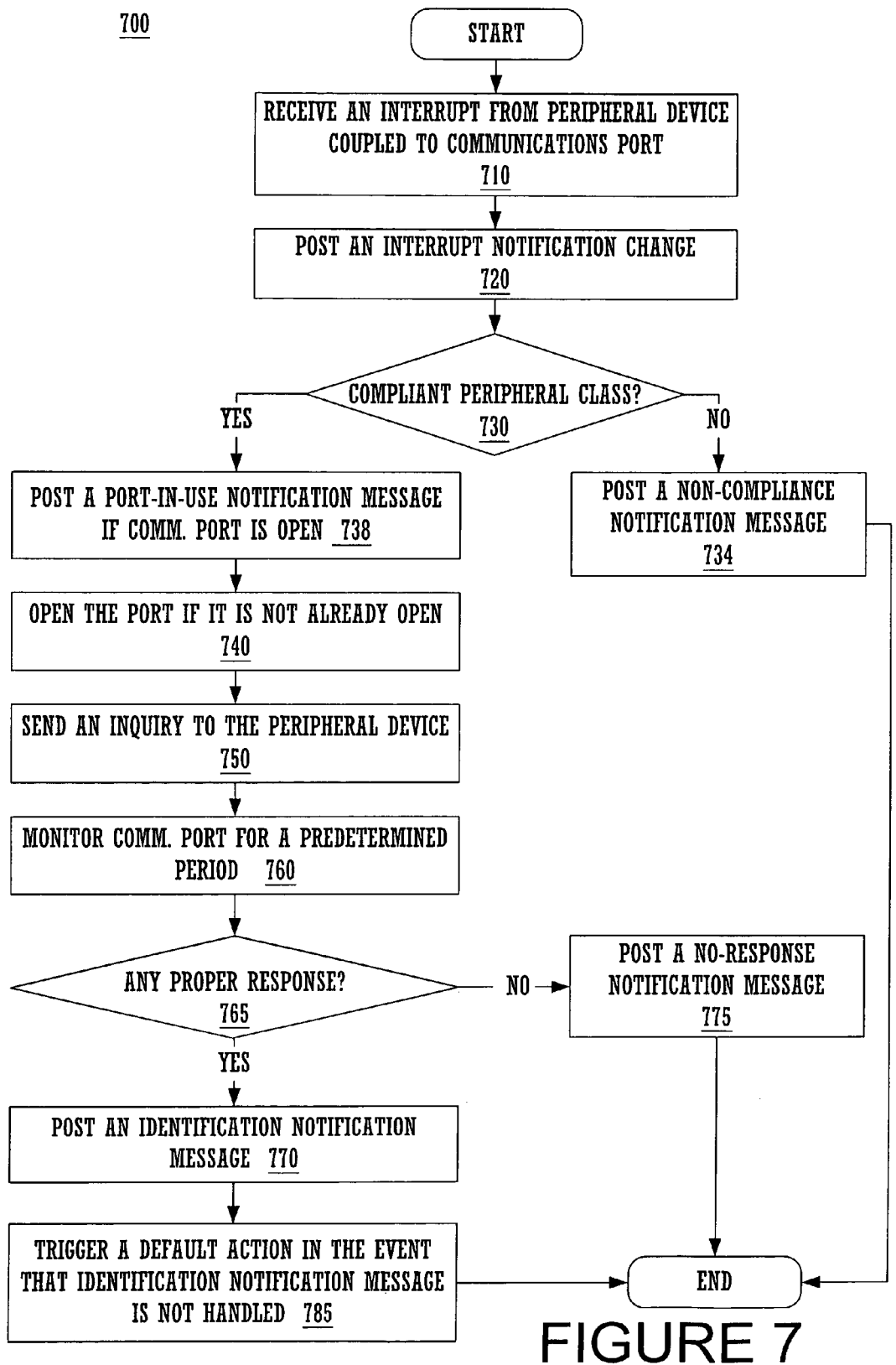
FIG. 7 is a flow diagram illustrating steps for identifying a peripheral device detachably coupled to a computer system in accordance with one embodiment of the present invention.

Operation of the Latency-Independent Peripheral Device Identification Method In Accordance with the Present Invention Referring next to FIG. 7, a flow diagram 700 illustrating steps for identifying a peripheral device detachably coupled to a computer system in accordance with one embodiment of the present invention is shown. In step 710, an interrupt is received by the computer system from a peripheral device coupled to a communications port of the computer system. In a currently preferred embodiment, the communications port is a serial communications port. Moreover, in an embodiment wherein the computer system is a Palm PDA, the interrupt is a HotSync interrupt.

Referring still to FIG. 7, in step 720, an interrupt notification message is posted to alert a notification handler running on the computer system, in response to the interrupt received in step 710. In one embodiment, the state of the device sense pin (VID pin) is included in the interrupt notification message.

In a currently preferred embodiment practiced upon a Palm compatible device (e.g., a device running on the Palm OS), a HotSync interrupt handler of the PalmOS reads the value of the VID pin and posts an interrupt notification message with this information. This notification message alerts, and is caught by, a HotSync interrupt notification handler which is registered with the PalmOS.

It is appreciated that in accordance with the present invention, the method by which the VID pin is read varies from device to device. For example, those devices that measure the voltage with an ADC will read a voltage and translate it into an enumerated value. This is no different than what is done for current Palm V devices which support only two enumerated types, namely, cradle or modem. On the other hand, devices without an ADC will just read a single bit off a port. In either case, the value will be posted as data along with the interrupt notification message according to this embodiment.

With reference still to FIG. 7, in step 730, it is determined whether the interrupt received is indicative of a compliant peripheral class. In one embodiment, the state (e.g., voltage) on the device sense pin of the communications port (e.g., posted as data along with the interrupt notification message of step 720) is used in this determination. In a currently preferred embodiment practiced upon a Palm compatible device, the HotSync interrupt notification handler examines the notification data and determines if the interrupt is from a compliant peripheral class, which in this embodiment is the RS-232 peripheral class.

In accordance with this embodiment, peripheral devices connecting to a Palm device's serial port that are neither cradles nor modems and that use the method of the present invention (e.g., belong to the compliant peripheral class) must hold the VID pin "high" (e.g., appear as modems). In this embodiment, no intermediate voltage on the VID pin needs to be measured. Moreover, the only known peripherals that hold VID high and use the interrupt pin are Palm modems, which will be distinguished from other peripherals via their response to an inquiry sent by the Palm device (described below with reference to step 750). As described below, the present invention will properly handle the cases where the attached device is a modem. As such, the instant embodiment is backward compatible with existing Palm devices, including external keyboards which hold VID low.

It is appreciated that future Palm devices, which might classify peripherals based on voltage ranges on the VID pin, can also advantageously utilize the present invention in a slightly different embodiments. More particularly, next generation peripheral interfaces have been proposed where different classes of peripherals are distinguished via different voltage levels on the VID pin. For example, there are currently six proposed levels of VID representing six different states, namely: no connection, USB cradle, RS-232 cradle, USB peripheral, RS-232 peripheral, and debug. When embodiments of the present invention are applied to these new interfaces, peripherals conforming to the present invention should set the voltage on the VID pin to the value that corresponds to class RS-232 peripherals.

With reference still to FIG. 7, in optional step 734, if it is determined in step 730 that the interrupt is not indicative of the compliant peripheral class, a non-compliance notification message is posted to trigger exception processing on the computer system. More specifically, in a currently preferred embodiment practiced upon a Palm compatible device, if the HotSync interrupt notification handler determines that the interrupt is not from a RS-232 peripheral, such as when the interrupt is from a cradle, then the HotSync interrupt notification handler posts a Cradle HotSync key event. Thus, the present embodiment is compatible with existing Palm cradles' Cradle HotSync function.

With reference again to FIG. 7, in optional step 738, if it is determined in step 730 that the interrupt is indicative of the compliant peripheral class and the communications port is already open, a port-in-use notification message is posted to trigger further processing. More specifically, in a currently preferred embodiment practiced upon a Palm compatible device, if the HotSync interrupt notification handler determines that the interrupt is from a RS-232 peripheral, such as a modem, and further determines that the serial port is already open (e.g., the port is active), then the handler posts a Modem HotSync with Serial Port Open notification, thereby triggering the Modem HotSync process. As such, the present embodiment advantageously provides compatibility with existing Palm modems' Modem HotSync function.

Referring again to FIG. 7, in step 740, if it is determined in step 730 that the interrupt is indicative of the compliant peripheral class, and the communications port is inactive, the port is opened. More specifically, in a currently preferred embodiment practiced upon a Palm compatible device, if the HotSync interrupt notification handler determines that the interrupt is from a RS-232 peripheral, and also determines that the serial port is not open (e.g., the port is inactive), then the handler opens the serial port. In one embodiment, the port is opened at a default baud rate of 9600 baud.

Still referring to FIG. 7, in step 750, an inquiry is sent to the peripheral device via the open communications port. In a currently preferred embodiment, the HotSync interrupt notification handler sends an inquiry, which comprises the ASCII command "ATI3" followed by a CR/LF pair, to the peripheral by way of the open serial port.

With reference again to FIG. 7, in step 760, the communications port is monitored for a predetermined time period in order to receive a response, if any, from the peripheral device via the port. In step 765, it is determined whether a proper response has been received from the peripheral device within the predetermined time period.

Referring yet again to FIG. 7, in step 770, if it is determined in step 765 that a proper response has been received from the peripheral device via the communications port within the predetermined time period, an identification notification message is posted based on data in the response, including information for classifying the peripheral device, so that a software handler registered with the operating system can handle the identification notification message (e.g., the appropriate handler performs, or caused to be performed, actions necessary to initialize the attached device) when the software handler receives it.

With reference still to FIG. 7, in optional step 775, if it is determined in step 765 that a proper response has not been received from the peripheral device via the communications port within the predetermined time period, a no-response notification message to trigger further processing.

With reference still to FIG. 7, in optional step 785, in the event that an identification notification message has been generated but the software handler responsible for handling the identification notification message fails to do so, a default action is triggered. It is appreciated that this scenario includes the case where the software handler is not properly installed or registered, or not installed at all.

Particularly, in a currently preferred embodiment practiced upon a Palm compatible device, the HotSync interrupt notification handler monitors the serial port and waits for a response from the peripheral for 20 ms. If the HotSync interrupt notification handler does not receive at least one character from the peripheral device within the allotted time, a no-response notification is posted. If at least one character is received within 20 ms from the initiation of the inquiry, the HotSync interrupt notification handler will wait for a maximum of 100 ms or until a CR/LF pair is received.

Further, in this embodiment, if a full response, terminated by a CR/LF pair, is received within the 100 ms, then the HotSync interrupt notification handler posts an identification notification message, with the ID string of the peripheral's response as data, to indicate that the peripheral queried has responded properly. In one embodiment, the identification information is propagated to a registered handler through a system notification or broadcast mechanism, such as through the Notification Manager supported by PalmOS version 3.5 or newer. However, if the character(s) received are not terminated by a CR/LF pair, then a no-response notification is posted instead. Within the scope of the present invention, it is up to the developers (of peripheral devices and their drivers, for example) to register custom-developed, device-specific software handler(s) with the operating system so that these special handlers will receive identification notifications corresponding to the peripheral(s) in which they are interested (e.g., those responses which contain the matching peripheral ID(s) in the data string) and handle them accordingly. Failing to do so would cause the identification notification to be handled in a default manner, as described below.

In accordance with one embodiment of the present invention, should no registered handler handle an identification notification message (described above with reference to optional step 785), a default low priority handler, installed by the operating system, will handle the notification by posting a Modem HotSync key event. Likewise, in another embodiment, should no registered handler handle a port-in-use notification message (described above with reference to optional step 738), a default low priority handler, installed by the operating system, will handle the notification by posting a Modem HotSync key event. Moreover, in yet another embodiment, where no response to the inquiry is received (described above with reference to optional step 775), a no-response notification message will be posted and the PalmOS will post the Modem HotSync key as well. This allows third party developers to catch this event and thus use this interrupt.

In an alternative embodiment, high priority notification handlers (e.g., having a higher priority than the HotSync interrupt notification handler) can be used in placed of the software handlers described above. In this embodiment, no device identification step needs to be performed because each high priority notification handler will directly catch and service an interrupt from its respective peripheral device when such an interrupt is sent via the communications port, without the aid of the HotSync interrupt notification handler. In other words, the processing steps described above with respect to the various actions of the HotSync interrupt notification handler are no longer required in this alternative embodiment, as each device-specific interrupt will directly alert its own special high priority notification handler(s) which will then perform the necessary action appropriate for the device generating the interrupt.

As thus described, the present invention performs neither detection of peripheral device attachment or detachment, nor counting of interrupts or time intervals. Moreover, unlike some prior art schemes, no further inquiry or signal is initiated by the device subsequent to, and within some period of, the initial interrupt in order for the present invention to operate. Rather, in accordance with the present invention, a peripheral device simply sends an interrupt to 'wake up' the operating system of the hand-held computer. Thereupon, a system notification handler is alerted to execute and initiate the device identification process by sending an inquiry to the peripheral device in response to the initial interrupt. Once the device is identified, the identification information is furnished to a registered handler which facilitates further interaction with the device. Alternatively, one or more high priority device-specific notification handlers can be installed instead, in which case each of the high priority handlers directly handle its own interrupt(s), and the system notification handler is unnecessary.

Significantly, embodiments of the present invention impose no time-critical interrupt response requirement for successful operation. Therefore, the present invention provides a superior solution to peripheral device identification than existing approaches, because the present invention is neither limited in the number of devices that can be identified, nor constrained by the dependence on the latency within which the initial device interrupt must be handled. In other words, by utilizing the present invention, even if a HotSync interrupt cannot be attended to immediately by the operating system, device identification will not be affected because there is no rigid time limit within which the interrupt must be serviced. As such, the present invention advantageously eliminates the latency dependency of prior art device identification schemes. In addition, there is no need to "patch" the interrupt service routine of the operating system or otherwise modify low level system code every time a new peripheral device is added to the list of devices that have to be identified. This greatly reduces the time required in the development cycle and provides an important advantage over the prior art, especially in a time-critical development environment.

Furthermore, since embodiments of the present invention utilize components and communication protocols/handshakes that are already parts of or supported by existing hand-held computer systems and that are well known in the art, such as serial communication ports and HotSync interrupts, respectively, embodiments of the present invention can be efficiently implemented and advantageously afford compatibility with other systems and applications, thereby providing latency-independent peripheral device identification capability while minimizing the cost to the user. Additionally, embodiments of the present invention can also be conveniently adapted to work with proposed communications port interfaces.

Although certain embodiments of the present invention as described herein pertains to PDAs such as Palm compatible organizers, it is appreciated that many other advantageous applications are possible within the scope of the present invention. For example, the present invention can be advantageously applied to the peripheral device identification mechanism of numerous other devices, such as mobile phones. Therefore, the present invention enables numerous possibilities in modern society where a wide range of systems and appliances require the capability of peripheral device identification. It should be clear to a person of ordinary skill in the art, having read the description of embodiments of the present invention herein, that other applications and embodiments not expressly described herein are also possible without departing from the scope and spirit of the present invention.

The preferred embodiment of the present invention, a method and system for latency-independent peripheral device identification, is thus described. While the present invention has been described in particular embodiments, it should be appreciated that the present invention should not be construed as limited by such embodiments, but rather construed according to the below claims.

What is claimed is:

1. A method of communicating with a peripheral device associated with a computer system, said method comprising:

triggering a signal responsive to a peripheral device being coupled to a communications port of said computer system;

responsive to said signal, posting a notification message to alert a notification handler, wherein said posting comprises:

responsive to said signal, determining if said peripheral device is among a compliant class of peripheral devices; and posting said notification message if said peripheral device is determined to be among said compliant class;

automatically opening said communications port if said communications port is contemporaneously closed;

transmitting a query to said peripheral device; and responsive to an answer to said query, posting an identification of said peripheral device. within said notification handler.

2. A method as described in claim 1 further comprising handling said peripheral device using a registered software handler in response to said identification of said peripheral device.

3. A method as described in claim 2 wherein said registered software handler is specific for said peripheral device.

4. A method as described in claim 3 wherein said computer system comprises a plurality of registered software handlers each being peripheral device-specific.

5. A method as described in claim 1 further comprising posting a port-in-use message responsive to said notification message if said communications port is already open upon receipt of said signal.

6. A method as described in claim 1 further comprising:

posting a non-compliance notification message if said peripheral device is determined not to be among said compliant class: and triggering exception processing in response to such non-compliance determination.

7. A method as described in claim 1 wherein said computer system further comprises:

a processor coupled to a bus;

a memory coupled to said bus;

a display screen coupled to said bus; and a user interface coupled to said bus.

8. A computer system comprising a processor coupled to a bus; a memory coupled to said bus; and a communications port coupled to bus wherein said memory comprises instructions that when executed implement a method of communicating with a peripheral device, said method comprising:

triggering a signal responsive to a peripheral device being coupled to said communications port;

responsive to said signal posting a notification message to alert a notification handler, wherein said posting comprises:

responsive to said signal, determining if said peripheral device is among a compliant class of peripheral devices; and posting said notification message if said peripheral device is determined to be among said compliant class;

automatically opening said communications port if said communications port is contemporaneously closed;

transmitting a query to said peripheral device; and responsive to an answer to said query, posting an identification of said peripheral device.

9. A computer system as described in claim 8 wherein said method further comprises handling said peripheral device using a registered software handler in response to said identification of said peripheral device.

10. A computer system as described in claim 9 wherein said registered software handler is specific for said peripheral device.

11. A computer system as described in claim 10 further comprising a plurality of registered software handlers each being peripheral device-specific.

12. A computer system as described in claim 8 wherein said method further comprises posting a port-in-use message responsive to said notification message if said communications port is already open upon receipt of said signal.

13. A computer system as described in claim 8 wherein said method further comprises:

posting a non-compliance notification message if said peripheral device is determined not to be among said compliant class; and triggering exception processing in response to such non-compliance determination.

\* \* \* \* \*